US012794842B2

(12) United States Patent
Tang et al.

(10) Patent No.: US 12,794,842 B2
(45) Date of Patent: Nov. 10, 2026

(54) MESSAGE PROCESSING METHOD AND APPARATUS, AND FIRST ELECTRONIC DEVICE

(71) Applicant: Huawei Technologies Co., Ltd., Shenzhen (CN)

(72) Inventors: Jian Tang, Xi'an (CN); Yongjie Zhao, Xi'an (CN); Zhen Zhong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 164 days.

(21) Appl. No.: 18/645,997

(22) Filed: Apr. 25, 2024

(65) Prior Publication Data

US 2024/0275749 A1 Aug. 15, 2024

Related U.S. Application Data

(63) Continuation of application No. PCT/CN2022/127320, filed on Oct. 25, 2022.

(30) Foreign Application Priority Data

Nov. 12, 2021 (CN) ......................... 202111341254.6
May 9, 2022 (CN) ......................... 202210503158.5

(51) Int. Cl.
*H04L 51/21* (2022.01)
*G06F 3/0484* (2022.01)

(52) U.S. Cl.
CPC ............ *H04L 51/21* (2022.05); *G06F 3/0484* (2013.01)

(58) Field of Classification Search
CPC ................................ G06F 3/0484; H04L 51/21
See application file for complete search history.

(56) References Cited

U.S. PATENT DOCUMENTS 11,153,235 B1 * 10/2021 Dalonzo ................. H04L 51/04
2010/0064015 A1 * 3/2010 Sacks ...................... G06Q 10/10 709/206
2015/0172584 A1 * 6/2015 Park ...................... H04L 51/046 715/752
2015/0277545 A1 * 10/2015 Flowers ................ G06F 3/0488 713/323
2016/0110059 A1 * 4/2016 Li ...................... G06Q 30/0267 715/825
2018/0270177 A1 * 9/2018 Liao ........................ H04L 51/52
2018/0352071 A1 * 12/2018 Karunamuni ........ G06Q 10/107
2021/0072813 A1 3/2021 Murali et al.

* cited by examiner

*Primary Examiner* — Seth A Silverman
(74) *Attorney, Agent, or Firm* — Conley Rose, P.C.

(57) ABSTRACT

In a message processing method, after receiving a message from a second electronic device, a first electronic device controls, using a microcontroller unit (MCU), a display of the first electronic device to display the message. Then, the first electronic device obtains an operation performed on the message and processes, using the MCU, the operation when the operation is a first operation type.

20 Claims, 7 Drawing Sheets

MESSAGE PROCESSING METHOD AND APPARATUS, AND FIRST ELECTRONIC DEVICE

CROSS-REFERENCE TO RELATED APPLICATIONS

This is a continuation of International Patent Application No. PCT/CN2022/127320, filed on Oct. 25, 2022, which claims priority to Chinese Patent Application No. 202111341254.6, filed on Nov. 12, 2021, and Chinese Patent Application No. 202210503158.5, filed on May 9, 2022. All of the aforementioned applications are hereby incorporated by reference in their entireties.

TECHNICAL FIELD

Embodiments of this disclosure relate to the field of intelligent terminal technologies, and in particular, to a message processing method and apparatus, and a first electronic device.

BACKGROUND

In the conventional technology, a wearable device may be implemented by using an application processor (AP) plus microcontroller unit (MCU) architecture. Specifically, the AP is responsible for application and user interface (UI) display, and the MCU is responsible for sports and health background monitoring and does not support the application and UI display.

In the AP plus MCU architecture, the AP focuses on all foreground services and AP background services. When a user receives a notification message from a mobile phone side, the AP is awakened in the foreground, the AP is responsible for displaying a message notification interface, and a reply action is completed on an AP side. When no operation on the AP side is involved, the AP side is in a dormant state.

However, a service between a wearable device and a mobile phone is based on BLUETOOTH. For example, a watch synchronizes sports and health data to the mobile phone, and/or the mobile phone synchronizes a notification message of an application to the wearable device. Delivery of a notification message of each application wakes up the AP to process a service, especially for an instant messaging application. Consequently, the AP is frequently awakened, and an overall battery life of the wearable device cannot reach an optimal value.

SUMMARY

Embodiments of this disclosure provide a message processing method and apparatus, and a first electronic device, and disclosed embodiments further provide a computer-readable storage medium, to avoid frequently waking up an AP and improve a battery life of the first electronic device.

According to a first aspect, an embodiment provides a message processing method applied to a first electronic device. The first electronic device includes a first processor and a second processor. The first processor is different from the second processor. The first processor is in a dormant state. The second processor is in a running state. The method may include the first electronic device receiving a message sent by a second electronic device and controlling, by using the second processor, a display of the first electronic device to display the message. Then, the first electronic device obtains an operation performed on the message by a user of the first electronic device, and processes, by using the second processor, the operation when a type of the operation is a first operation type. The first operation type includes a shortcut operation.

In the message processing method, after receiving the message sent by the second electronic device, the first electronic device controls, by using an MCU, the display to display the message. Then, the first electronic device obtains the operation performed on the message by the user of the first electronic device, and processes, by using the MCU, the operation when the type of the operation is the first operation type. In this way, the operation of the user can be processed by the MCU. This avoids frequently waking up an AP and can improve a battery life of the first electronic device.

The first electronic device may be a wearable device, and the second electronic device may be an intelligent electronic device. The first processor may be an AP, and the second processor may be an MCU.

In a possible implementation, controlling, by the second processor, the display of the first electronic device to display the message may be implemented by controlling the display to display the message in half screen, and if the first electronic device detects within predetermined duration of receiving the message, an operation that the user triggers message viewing, controlling, using the second processor, the display to display the message in full screen.

In a possible implementation, the message sent by the second electronic device includes a message obtained from a notification bar of the second electronic device. In this way, after receiving the message sent by the second electronic device, the first electronic device may further determine, by using the second processor, whether the message supports being replied to.

In a possible implementation, determining, by using the second processor, whether the message supports being replied to may include determining, by using the second processor, whether a tag indicating that replying is supported exists in the message, where the tag indicating that replying is supported is added by the second electronic device to the message obtained from the notification bar after the second electronic device determines that the message obtained from the notification bar supports being replied to, and if the tag indicating that replying is supported exists in the message, determining that the message supports being replied to, or if the tag indicating that replying is supported does not exist in the message, determining, by using the second processor, whether the message matches a pre-stored message that supports being replied to, and if yes, determining that the message supports being replied to.

In a possible implementation, processing, by using the second processor, the operation when the type of the operation is the first operation type may include, when the message supports being replied to, and the operation is an operation of a shortcut reply, obtaining content of the shortcut reply by using the second processor and sending the content of the shortcut reply to the second electronic device through a channel between the second processor and the second electronic device.

In a possible implementation, after the operation performed on the message, by the user that uses the first electronic device is obtained, the first processor is awakened by using the second processor, and the operation is processed by using the first processor when the type of the operation is a second operation type. The second operation type includes a customized operation.

In a possible implementation, awakening the first processor by using the second processor, and processing the operation using the first processor when the type of the operation is a second operation type may include, when the message supports being replied to, and the operation is an operation of triggering a customized reply, waking up the first processor by using the second processor and obtaining content of the customized reply by using the first processor and sending the content of the customized reply to the second electronic device through a channel between the first processor and the second electronic device.

In a possible implementation, the tag indicating that replying is supported includes a package name of an application that is in the second electronic device and that sends the message, a user-level identifier in the application, and a process number of running the application.

In a possible implementation, before obtaining the operation performed on the message by the user that uses the first electronic device, the first electronic device may further display prompt information. The prompt information prompts that the message is processed by the second electronic device. In this way, processing, by using the second processor, the operation when the type of the operation is the first operation type may include, when the operation is a determining indication of the user for the prompt information, sending the determining indication to the second electronic device through a channel between the second processor and the second electronic device, receiving a processing result of the message sent by the second electronic device, and controlling, by using the second processor, the display to display the processing result.

According to a second aspect, an embodiment provides a message processing apparatus. The apparatus is included in a first electronic device. The apparatus has a function of implementing behavior of the first electronic device in the first aspect and the possible implementations of the first aspect. The function may be implemented by hardware, or may be implemented by hardware executing corresponding software. The hardware or software includes one or more modules or units corresponding to the foregoing function, for example, a receiving module or unit, a processing module or unit, and a sending module or unit.

According to a third aspect, an embodiment provides a first electronic device, including a first processor, a second processor, a memory, a plurality of applications, and one or more computer programs. The first processor is different from the second processor. The first processor is in a dormant state. The second processor is in a running state. The one or more computer programs are stored in the memory. The one or more computer programs include instructions. When the instructions are executed by the first electronic device, the first electronic device is enabled to perform steps for receiving a message sent by a second electronic device, controlling, by using the second processor, a display of the first electronic device to display the message, obtaining an operation performed on the message by a user that uses the first electronic device, and processing, by using the second processor, the operation when a type of the operation is a first operation type. The first operation type includes a shortcut operation.

In a possible implementation, when the instructions are executed by the first electronic device, the first electronic device is enabled to perform the step of controlling, by using the second processor, a display of the first electronic device to display the message by controlling, using the second processor, the display to display the message in half screen and if the first electronic device detects, within predetermined duration of receiving the message, an operation that the user triggers message viewing, controlling, by using the second processor, the display to display the message in full screen.

In a possible implementation, the message sent by the second electronic device includes a message obtained from a notification bar of the second electronic device. When the instructions are executed by the first electronic device, after the first electronic device is enabled to perform the step of receiving a message sent by a second electronic device, further determining, by using the second processor, whether the message supports being replied to.

In a possible implementation, when the instructions are executed by the first electronic device, enabling the first electronic device to perform the step of determining, by using the second processor, whether the message supports being replied to may include determining, by using the second processor, whether a tag indicating that replying is supported exists in the message, where the tag indicating that replying is supported is added by the second electronic device to the message obtained from the notification bar after the second electronic device determines that the message obtained from the notification bar supports being replied to, and if the tag indicating that replying is supported exists in the message, determining that the message supports being replied to, or if the tag indicating that replying is supported does not exist in the message, determining, by using the second processor, whether the message matches a pre-stored message that supports being replied to, and if yes, determining that the message supports being replied to.

In a possible implementation, when the instructions are executed by the first electronic device, enabling the first electronic device to perform the step of processing, by using the second processor, the operation when a type of the operation is a first operation type may include, when the message supports being replied to, and the operation is an operation of a shortcut reply, obtaining content of the shortcut reply by using the second processor and sending the content of the shortcut reply to the second electronic device through a channel between the second processor and the second electronic device.

In a possible implementation, when the instructions are executed by the first electronic device, after the first electronic device is enabled to perform the step of obtaining an operation performed, on the message, by a user that uses the first electronic device, the following step is further performed, waking up, by using the second processor, the first processor and processing, by using the first processor, the operation when the type of the operation is a second operation type. The second operation type includes a customized operation.

In a possible implementation, when the instructions are executed by the first electronic device, enabling the first electronic device to perform the step of waking up, by using the second processor, the first processor and processing, by using the first processor, the operation when the type of the operation is a second operation type may include, when the message supports being replied to, and the operation is an operation of triggering a customized reply, waking up the first processor by using the second processor and obtaining content of the customized reply by using the first processor and sending the content of the customized reply to the second electronic device through a channel between the first processor and the second electronic device.

In a possible implementation, the tag indicating that replying is supported includes a package name of an application that is in the second electronic device and that sends the message, a user-level identifier in the application, and a process number of running the application.

In a possible implementation, when the instructions are executed by the first electronic device, before the first electronic device is enabled to perform the step of obtaining an operation performed on the message by a user that uses the first electronic device, displaying prompt information, where the prompt information prompts that the message is processed by the second electronic device. When the instructions are executed by the first electronic device, that the first electronic device is enabled to perform the step of processing, by using the second processor, the operation when a type of the operation is a first operation type may include, when the operation is a determining indication of the user for the prompt information, sending the determining indication to the second electronic device through a channel between the second processor and the second electronic device, receiving a processing result of the message sent by the second electronic device, and controlling, by using the second processor, the display to display the processing result.

It should be understood that the technical solutions in the second aspect and the third aspect of embodiments are consistent with the technical solutions in the first aspect of embodiments, and beneficial effects achieved by the aspects and corresponding feasible implementations are similar. Details are not described again.

According to a fourth aspect, an embodiment provides a computer-readable storage medium. The computer-readable storage medium stores a computer program. When the computer program is run on a computer, the computer is enabled to perform the method according to the first aspect.

According to a fifth aspect, an embodiment provides a computer program. When the computer program is executed by a computer, the computer program is used to perform the method according to the first aspect.

In a possible design, the program in the fifth aspect may be all or partially stored in a storage medium that is packaged with a processor, or may be all or partially stored in a memory that is not packaged with a processor.

DESCRIPTION OF EMBODIMENTS

Terms used in this disclosure explain examples of embodiments and are not intended to limit this disclosure.

In a conventional technology, a wearable device may be implemented by using an AP plus MCU architecture. A service between the wearable device and a mobile phone is based on BLUETOOTH. Delivery of a notification message of each application wakes up the AP to process a service, especially for an instant messaging application. Consequently, the AP is frequently awakened, and an overall battery life of the wearable device cannot reach an optimal value.

Based on the foregoing problem, embodiments of this disclosure provide a message processing method to determine a processing policy based on power consumption of a service and determine a processing channel of the service based on a type of reply content. In this way, the service is dynamically run on an MCU side or an AP side. This avoids frequently waking up the AP and can improve a battery life of a wearable device.

The message processing method provided in embodiments may be applied to a first electronic device. The first electronic device may be a wearable device, a vehicle-mounted device, an augmented reality (AR)/virtual reality (VR) device, an ultra-mobile personal computer (UMPC), a netbook, a personal digital assistant (PDA), or the like. A specific type of the first electronic device is not limited in embodiments.

Figure 1:
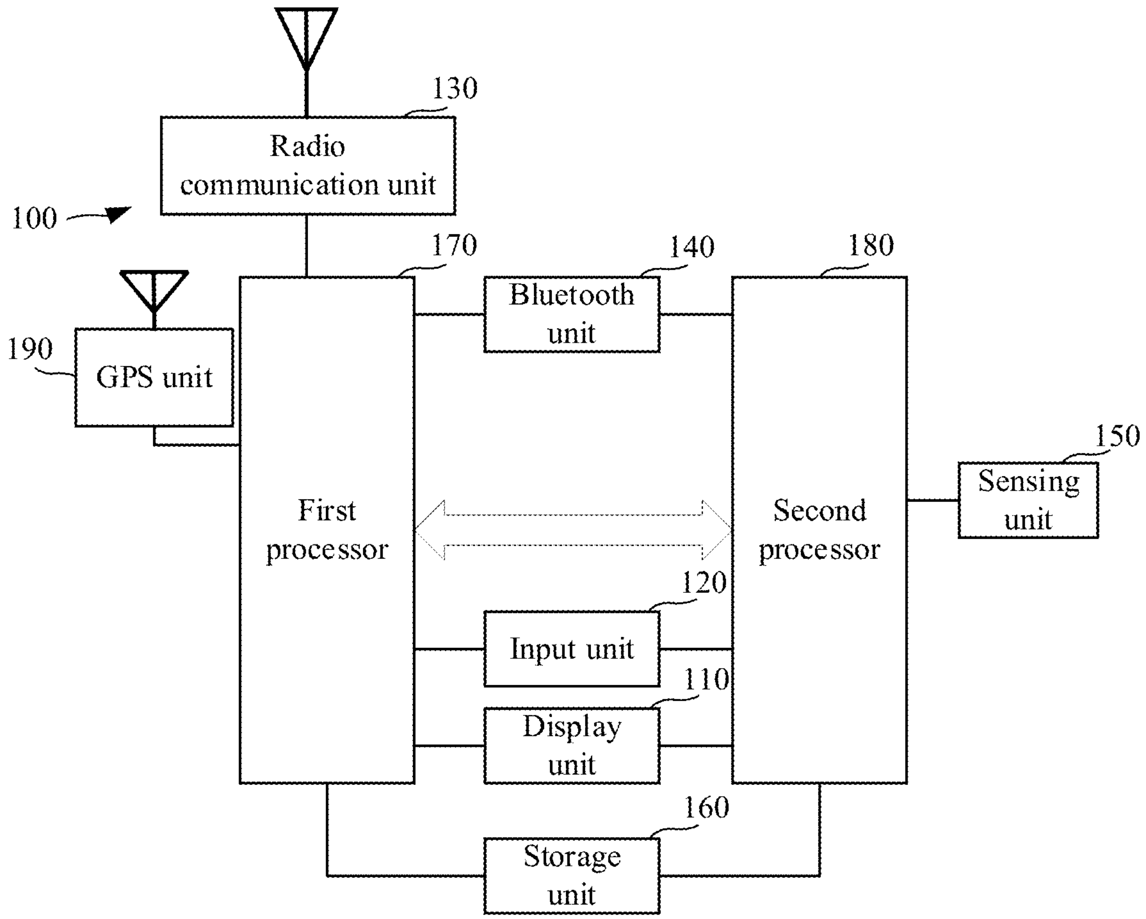
FIG. 1 is a schematic diagram of a structure of a first electronic device according to an embodiment.

For example, FIG. 1 is a schematic diagram of a structure of a first electronic device according to an embodiment. As shown in FIG. 1, the first electronic device 100 may include a display unit 110, an input unit 120, a radio communication unit 130, a Bluetooth unit 140, a sensing unit 150, a storage unit 160, a first processor 170, a second processor 180, and a Global Positioning System (GPS) unit 190.

The first processor 170 may be responsible for executing various software programs (such as an application and an operating system), to provide calculation and processing operations used for the first electronic device 100. The first processor 170 may be a central processing unit (CPU) or an application processor (AP).

The second processor 180 is mainly responsible for detecting data of the sensing unit 150. The second processor 180 includes any one of the following: a low-power processor, a low-power microprocessor unit (MPU), or an MCU. The second processor 180 runs appropriate software or a combination of a hardware element and a software element.

Generally, the first processor 170 is in a dormant state, and the second processor 180 is in a running state. Specifically, after receiving a message sent by a second electronic device, the first electronic device 100 displays the message by using the second processor 180. If the message supports being replied to, the first electronic device 100 may perform, by using the second processor 180, a shortcut reply to the message that supports being replied to. If a user needs to perform a customized reply, the second processor 180 wakes up the first processor 170, and the first processor 170 processes the message.

The display unit 110 is configured to display a graph, an image, or data to the user. The display unit 110 is configured to provide various screens associated with operations of the first electronic device 100. The display unit 110 provides a home screen, a message writing screen, a phone screen, a game screen, a music playing screen, and a video playing screen. The display unit 110 may be implemented by using a flat display panel (such as a liquid-crystal display (LCD), an organic light-emitting diode (OLED), and an active-matrix OLED (AMOLED)).

The display unit 110 is connected to the first processor 170 and the second processor 180. The first processor 170 and the display unit 110 may be configured to communicate with each other by using an interface such as (but is not limited to) the following: a red-blue-green (RGB) interface, an MDDI (mobile display digital interface), and an MIPI (mobile industry processor interface). The second processor 180 and the display unit 110 may be configured to communicate with each other by using an interface such as (but is not limited to) the following: an SPI (serial peripheral interface) or an I2C (inter-integrated circuit).

When the display unit 110 is implemented in a form of a touchscreen, the display unit 110 may be used as an input apparatus for working. When the display unit 110 is implemented in the form of a touchscreen, the display unit 110 includes a touch panel configured to detect a touch gesture. The touch panel is configured to convert, into an electrical input signal, pressure applied to a specific position of the display unit 110 or a change in capacitance of a specific area of the display unit 110. The touch panel may be implemented in an add-on (add-on) manner or an on-cell (or in-cell) manner.

The touch panel may be implemented as one of the following panels: a resistive touch panel, a capacitive touch panel, an electromagnetic induction touch panel, and a pressure touch panel. The touch panel is configured to detect touch pressure, a touched position, and a touched area. If a touch gesture is made on the touch panel, a corresponding input signal is generated to the first processor 170. Then, the first processor 170 checks touch input information of the user to execute a corresponding function.

The input unit 120 includes a module associated with an input of the first electronic device 100. The input unit 120 receives a user input associated with configuration and control of a function of the first electronic device 100, and generates a corresponding input signal to the first processor 170. The input unit 120 may be implemented by using at least one of the following: a touchpad, a touchscreen, a common keyboard, a QWERTY keyboard, and a special function button (such as a power button or a volume button). The input unit 120 is connected to the first processor 170 and the second processor 180.

The radio communication unit 130 is responsible for a communication function of the electronic device. The radio communication unit 130 establishes a communication channel with a supportable mobile communication network to implement a voice call, a video conference, and data communication. The radio communication unit 130 includes a radio frequency (RF) transmitter and an RF receiver. The RF transmitter is configured to perform up-conversion and amplification on a transmitted signal. The RF receiver is configured to perform low noise amplification and down-conversion on a received signal. The radio communication unit 130 includes a cellular communication module (such as a third generation (3G) cellular communication module and/or a 4G cellular communication module) and a digital broadcast module.

The GPS unit 190 The GPS unit 190 receives a satellite GPS signal from a GPS satellite, and transfers the GPS signal to the first processor 170. The first processor 170 is configured to calculate a current position of the electronic device based on the satellite GPS signal.

The sensing unit 150 is connected to the second processor 180, detects a change in position information or a change in a surrounding environment of the first electronic device 100, and sends sensed information to the second processor 180. Specifically, the sensing unit 150 includes at least one of the following: a gyroscope sensor configured to detect rotation, rotation movement, angular displacement, a tilt, or any other non-linear motion, a three-axis acceleration sensor configured to sense accelerations in one or more directions, a barometer configured to measure a pressure altitude, an ambient light sensor configured to sense ambient light, and an infrared (IR) sensor and a proximity sensor that are configured to sense a gesture. The sensing unit 150 performs an operation under control of the second processor 180.

The first electronic device 100 may receive motion sensor data generated by a motion sensor (such as the gyroscope sensor or the acceleration sensor) in the sensing unit 150, to generate a specific motion event (such as a walking event or a shaking event) of the motion sensor data. The first electronic device 100 may process the generated motion sensor data by using a motion sensing application. For example, a processor running the motion sensing application may analyze the motion sensor data, to identify a motion event of a specific type.

Optionally, the sensing unit 150 may be separately connected to the first processor 170 and the second processor 180.

The first processor 170 and the second processor 180 may be configured to communicate with each other by using an interface such as (but is not limited to) the following: one or more universal serial bus (USB) interfaces, a micro-USB interface, a universal asynchronous receiver/transmitter (UART) interface, and a general purpose input/output (GPIO) interface.

The first electronic device 100 may further include another processor, and may be further implemented as that the first processor 170 and the second processor 180 are a dual-core chip, a multi-core chip, or the like located in a single chip. In other words, the first processor 170 and the second processor 180 are disposed in a same integrated circuit chip, or may be respectively disposed in different integrated circuit chips.

The storage unit 160 is configured to store various data that is executed and processed in the first electronic device 100, and an operating system (OS) and various applications of the electronic device. The storage unit 160 is implemented by using at least one of the following: a random-access memory (RAM), a read-only memory (ROM), a flash memory, a volatile memory, an erasable programmable read-only memory (EPROM), and an electrically erasable programmable read-only memory (EEPROM), but is not limited thereto. The storage unit 160 includes a data area and a program area. The data area of the storage unit 160 stores data generated in the first electronic device 100 and externally downloaded data.

The program area of the storage unit 160 stores applications used for guiding the operating system (OS), a navigation function, a video and audio playback function, and an image display function of the electronic device under control of the first processor 170. The program area is further configured to store applications used for a broadcast and playback function, an audio recording function, a calculator function, a calendar function, and the like. For a description purpose, the storage unit 160 is shown as being separated from the first processor 170 and located outside the first processor 170. However, in various embodiments, a part or all of the storage unit 160 may be integrated on a same integrated circuit as the first processor 170.

A storage area of the storage unit 160 further includes an extra storage area controlled by the second processor 180. Access to the extra storage area controlled by the second processor 180 is allowed even if the first processor 170 is in a power saving mode. The extra storage area controlled by the second processor 180 may be integrated on a same integrated circuit as the second processor 180, but is not limited thereto.

The Bluetooth unit 140 is responsible for performing short range communication with another Bluetooth communication apparatus (such as a tablet computer or a smartphone). The Bluetooth unit 140 may be any hardware and/or software element configured to transmit (for example, send and/or receive) data by using one or more wired and/or wireless protocols. The Bluetooth unit 140 mainly transmits data by using a Bluetooth protocol.

The Bluetooth unit 140 is connected to the first processor 170 and the second processor 180.

It should be noted that, in descriptions of the following embodiments, an example in which the first electronic device 100 is a wearable device 100 is used for description. In addition, the message sending method provided in embodiments further relates to a second electronic device. The second electronic device may be an intelligent electronic device such as a smartphone, a tablet computer, a wearable device, a vehicle-mounted device, an AR/VR device, a notebook computer, a UMPC, a netbook, or a PDA. A specific type of the second electronic device is not limited in embodiments. In descriptions of the following embodiments, an example in which the second electronic device is a smartphone is used for description.

The message sending method provided in embodiments is based on a Bluetooth dual channel, that is, based on a capability of establishing two Bluetooth logical channels by the smartphone with both the first processor 170 and the second processor 180 in the wearable device 100. Specifically, after a message of an application in the smartphone is sent to a notification bar on a mobile phone side, a management APP (for example, a sports and health application (APP)) that is in the smartphone and that is responsible for forwarding a message and connecting to the wearable device 100 transmits the message to a wearable device 100 side. After receiving the message sent by the smartphone, the wearable device 100 displays the message by using an MCU by default. For example, a half-screen notification pops up on the wearable device 100 side, and the message is displayed in full screen after a user taps the notification.

Figure 2:
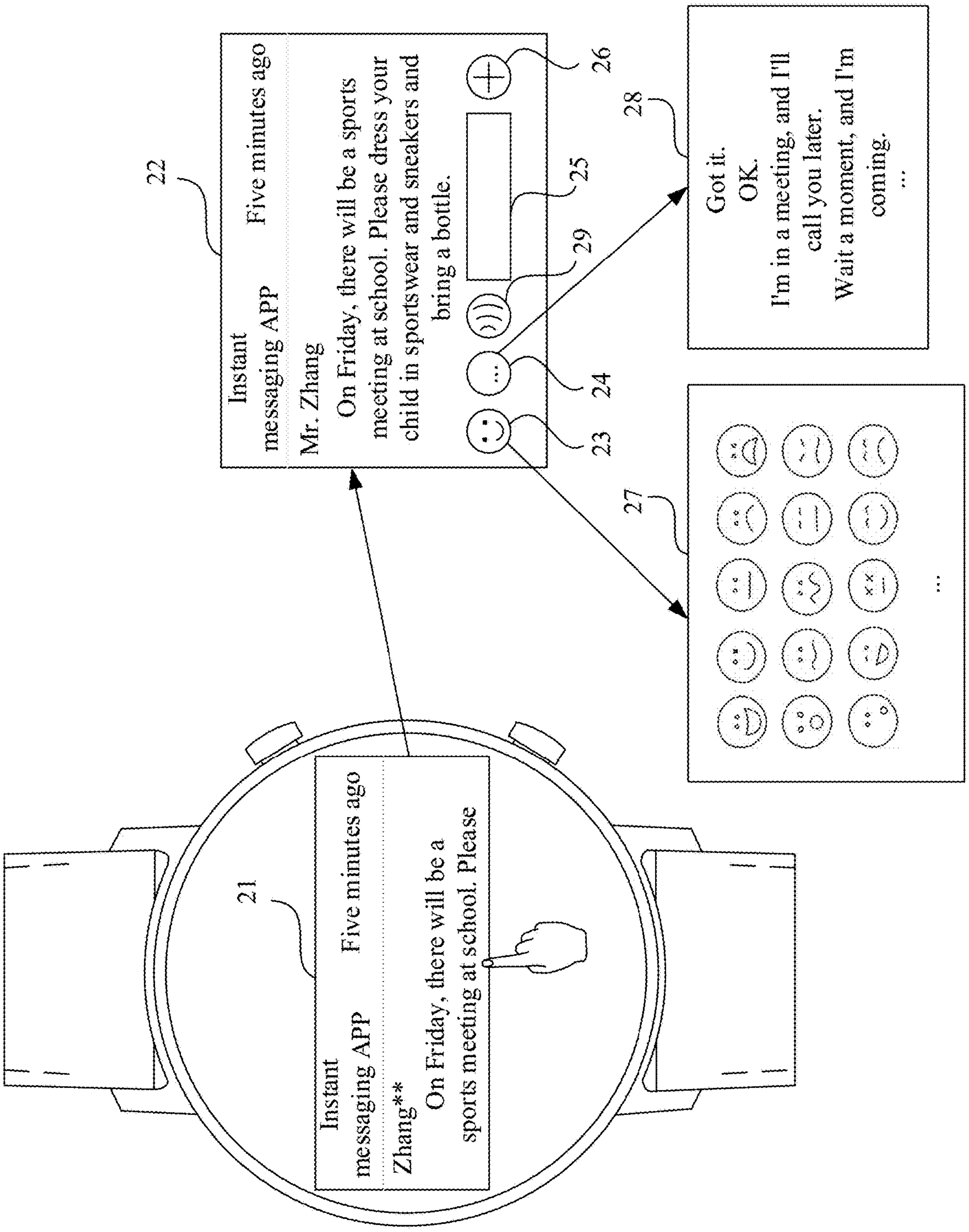
FIG. 2 is a schematic diagram of a message display interface on a wearable device 100 side according to an embodiment.

When the message in the notification bar on the mobile phone side is a reply able message, for example, a message sent by an instant messaging APP, the management APP in the smartphone may obtain key information in the replyable message, for example, information such as a process number, a package name of the application, and/or a timestamp of the message, pack the key information into a Bluetooth instruction, and transmit the Bluetooth instruction to the wearable device 100 side. After receiving the tagged message, the wearable device 100 displays the message by using the second processor 180 by default. For example, a half-screen notification pops up on the wearable device 100 side, and the message is displayed in full screen after a user taps the notification. FIG. 2 is a schematic diagram of a message display interface on a wearable device 100 side according to an embodiment. It can be learned from FIG. 2 that, after the wearable device 100 receives the replyable message sent by the smartphone, the pop-up half-screen notification may be shown in an interface 21. After the user taps the half-screen notification, the wearable device 100 may display the message in full screen, as shown in an interface 22.

For the replyable message, the wearable device 100 may provide a shortcut reply function by using the second processor 180, for example, transmitting predefined text information or an emoji-based emoticon. When a user needs to perform a customized reply (for example, an image, a voice, a text, a customized emoticon, a motion record, or a name card of a contact), the second processor 180 wakes up the first processor 170, and the first processor 170 performs processing.

Refer to FIG. 2. The wearable device 100 may provide the shortcut reply function by using an icon 23 and an icon 24. Specifically, when the user taps the icon 23, the wearable device 100 may display an interface 27. It can be seen from FIG. 2 that the interface 27 displays emoji emoticons. After the user selects an emoji emoticon from the interface 27, the wearable device 100 may obtain the emoticon selected by the user, and transfer, by using the second processor 180, the emoticon to an APP (referred to as a management APP below) that is in the smartphone and that is responsible for forwarding a message and connecting to the wearable device 100. Then, the management APP in the smartphone pushes, to the notification bar of the smartphone, the emoticon transferred by the second processor 180 in the wearable device 100. In this way, a reply operation is completed by using an application on the smartphone side. When the user taps the icon 24, the wearable device 100 may display an interface 28. It can be seen from FIG. 2 that the interface 28 displays predefined text information. After the user selects predefined text information from the interface 28, the wearable device 100 may obtain the text information selected by the user, and transfer the text information to the management APP in the smartphone by using the second processor 180. Then, the management APP in the smartphone pushes, to the notification bar of the smartphone, the text information transferred by the second processor 180 in the wearable device 100. In this way, a reply operation is completed by using an application on the smartphone side.

When the user needs to perform a customized reply, the user may tap an information box 25 and input a customized text, or the user may tap an icon 26 and select a customized emoticon, a motion record, a name card of a contact, or the like, or the user may tap an icon 29 and input a voice. Then, the wearable device 100 obtains information input by the user, and transfers the information to the management APP in the smartphone by using the first processor 170. Then, the management APP in the smartphone pushes, to the notification bar of the smartphone, the information transferred by the first processor 170 in the wearable device 100. In this way, a reply operation is completed by using an application on the smartphone side.

It should be noted that, if a message of the notification bar on the smartphone side has been cleared by the user, but a status of the message on the wearable device 100 side is not synchronized, the message on the wearable device 100 side fails to be replied to.

Figure 3:
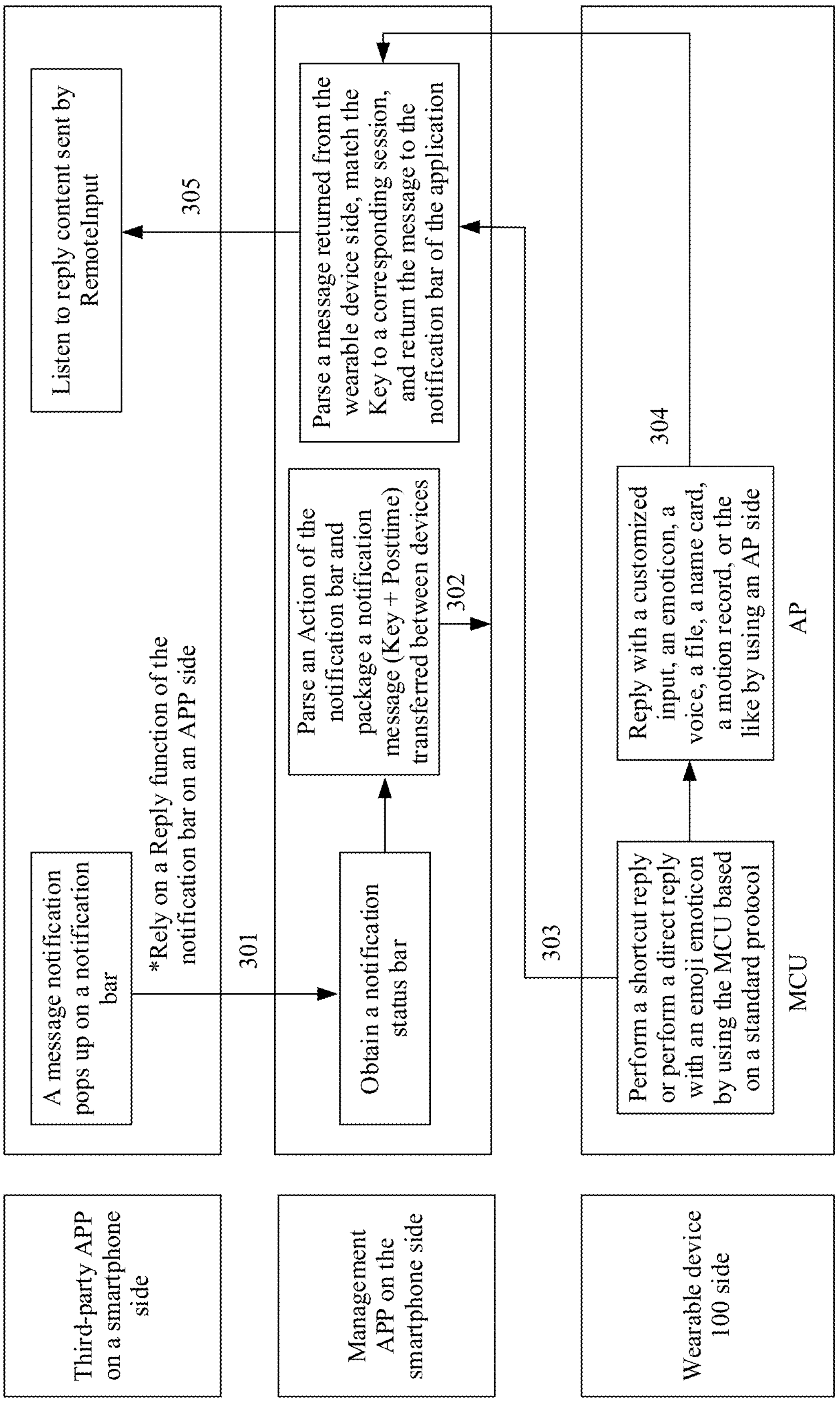
FIG. 3 is a schematic diagram of a system architecture according to an embodiment.

FIG. 3 is a schematic diagram of a system architecture according to an embodiment. As shown in FIG. 3, a smartphone separately establishes a Bluetooth channel with an MCU and an AP in a wearable device 100. A message reply mechanism of the wearable device 100 may include the following steps.

301: A notification bar on a smartphone side receives a notification of a replyable message of an instant messaging APP.

302: A management APP on the smartphone side is responsible for synchronizing the message to the wearable device 100. The management APP may be an APP that is in the smartphone and that is responsible for forwarding a message and connecting to the wearable device 100, for example, a sports and health APP.

303: In a dormant scenario of a first processor 170 on a wearable device 100 side, the message is processed by a second processor 180, for example, a user performs a customized reply, and the second processor 180 wakes up the first processor 170 to perform a related operation.

304 to 305: The management APP on the smartphone side is responsible for forwarding the message to the notification bar, and finally sends the message to an application by relying on a system capability of the smartphone, to complete a reply operation.

A message reply policy on the wearable device 100 side may be shown in Table 1.

TABLE 1

| Sequence number | Type | Processing system on the wearable device 100 side | Policy |
|---|---|---|---|
| 1 | Predefined reply | Second processor 180 | |
| 2 | Emoji emoticon | Second processor 180 | |
| 3 | Customized input | First processor 170 | Customized emoticon, customized text, file, image, and/or name card of a contact |

For ease of understanding, in the following embodiment, an example in which the wearable device 100 has the structure shown in FIG. 1 is used to describe in detail the message processing method provided in embodiments with reference to the system architecture shown in FIG. 3.

Figure 4:
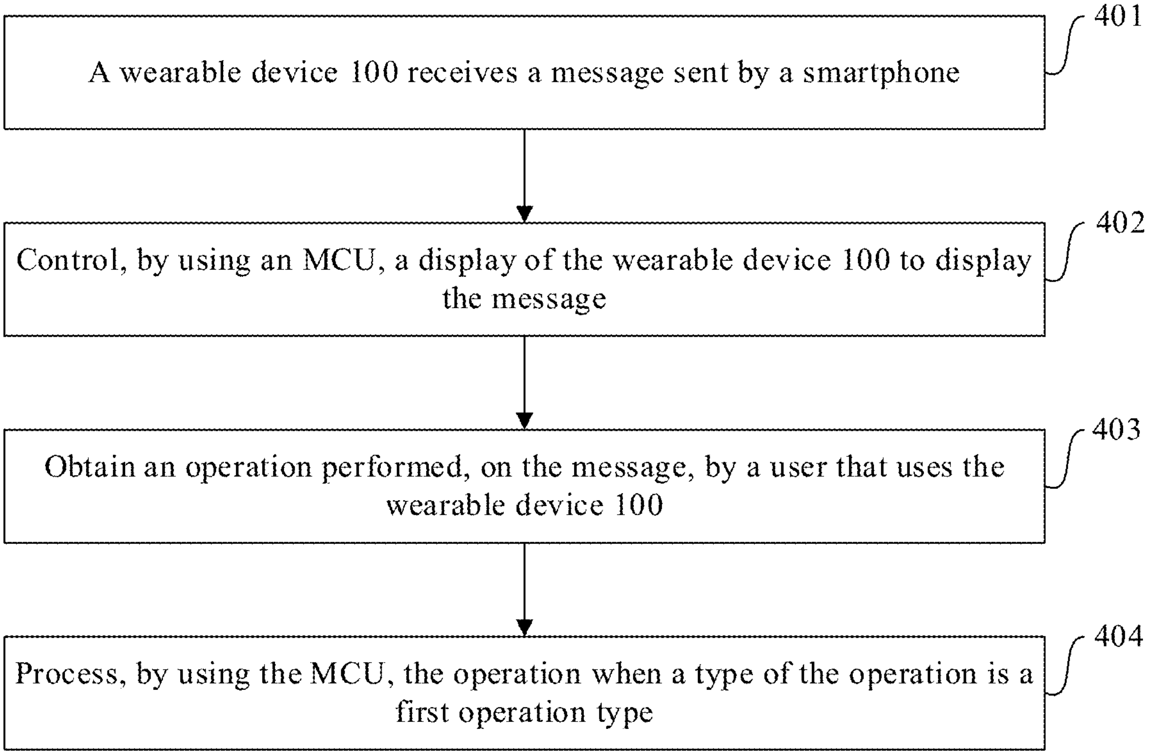
FIG. 4 is a flowchart of a message processing method according to an embodiment.

FIG. 4 is a flowchart of a message processing method according to an embodiment. The message processing method may be applied to a wearable device 100. The wearable device 100 may include a first processor 170 and a second processor 180. The first processor 170 is different from the second processor 180. The first processor 170 is in a dormant state. The second processor 180 is in a running state. In descriptions of the following embodiments, an example in which the first processor 170 is an AP and the second processor 180 is an MCU is used for description.

As shown in FIG. 4, the message processing method may include the following steps.

Step 401: The wearable device 100 receives a message sent by a smartphone.

The message sent by the smartphone may be obtained by the smartphone from a notification bar of the smartphone. For example, the message may be a message received by an instant messaging APP, or may be a push message received by a news APP or a video APP. A type of the message is not limited in embodiments.

Specifically, after obtaining the message from the notification bar, a management APP in the smartphone may select a channel between the smartphone and the MCU of the wearable device 100 based on a channel selection policy, and send, to the MCU of the wearable device 100, the message obtained from the notification bar. The channel between the smartphone and the MCU of the wearable device 100 may be a Bluetooth channel, or may be a Wi-Fi channel, or may be a wireless communication channel of another type. A type of the channel between the smartphone and the MCU of the wearable device 100 is not limited in embodiments. During specific implementation, the MCU of the wearable device 100 may establish the channel with the smartphone by using the Bluetooth unit 140.

Step 402: Control, by using the MCU, a display of the wearable device 100 to display the message.

The display of the wearable device 100 may be the display unit 110 in FIG. 1.

Specifically, controlling, by using the MCU, the display of the wearable device 100 to display the message may be: controlling, by using the MCU, the display to display the message in half screen; and if the wearable device 100 detects, within predetermined duration of receiving the message, an operation that the user triggers message viewing, controlling, by using the MCU, the display to display the message in full screen. The operation of triggering message viewing may be tapping, double tapping, or touching and holding, by the user, the message displayed in half screen, or the operation of triggering message viewing may be an operation of raising a wrist by the user. A type of the operation of triggering message viewing is not limited in embodiments. This embodiment is described by using the operation of raising a wrist by the user as an example.

The predetermined duration may be automatically set based on system performance and/or an implementation requirement during specific implementation. The predetermined duration is not limited in embodiments. For example, the predetermined duration may be one minute.

Specifically, after the MCU of the wearable device 100 receives the message, a dual-system collaboration mechanism is implemented, and the message is forwarded between the MCU and the AP of the wearable device 100. The MCU is responsible for buffering the message, and simultaneously listens to wake-up and a buffer threshold of the AP. The MCU actively synchronizes the buffered message to an AP side.

After receiving the message sent by the smartphone, the MCU controls the display unit 110 to display the message in half screen, as shown in the interface 21 in FIG. 2. If the user raises the wrist to turn on the screen to view the message within one minute after receiving the message, the MCU controls the display unit 110 to display the message in full screen, as shown in the interface 22 in FIG. 2. In this case, the MCU does not need to wake up the AP. If the user does not perform an operation of viewing the message within one minute after receiving the message, after one minute after receiving the message, the user needs to slide on an interface displayed by the display unit 110 to enter a message center (wake up the AP), and tap to view a message.

Step 403: Obtain an operation performed, on the message, by the user that uses the wearable device 100.

Step 404: Process, by using the MCU, the operation when a type of the operation is a first operation type.

The first operation type may include a shortcut operation. For example, the shortcut operation may be a shortcut reply operation, a shortcut setting operation, and/or a shortcut control operation. A specific operation form of the shortcut operation is not limited in embodiments.

In the message processing method, the wearable device 100 receives the message sent by the smartphone and controls, by using the MCU, the display of the wearable device 100 to display the message. Then, the wearable device 100 obtains the operation performed, on the message, by the user that uses the wearable device 100, and processes, by using the MCU, the operation when the type of the operation is the first operation type. In this way, the operation of the user can be processed by using the MCU. This avoids frequently waking up the AP and can improve a battery life of the wearable device 100.

Figure 5:
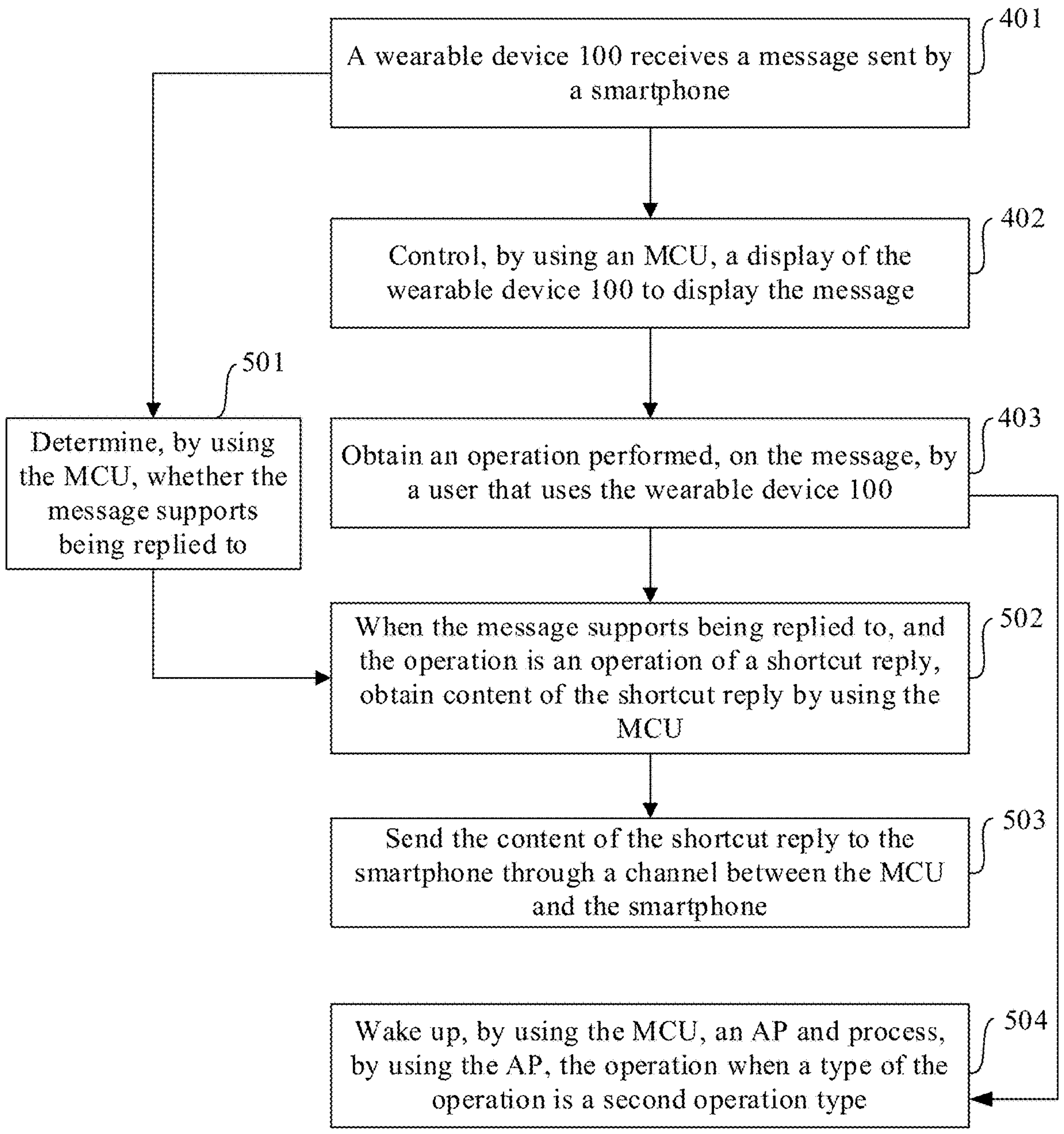
FIG. 5 is a flowchart of a message processing method according to another embodiment.

FIG. 5 is a flowchart of a message processing method according to another embodiment. As shown in FIG. 5, in the embodiment shown in FIG. 4, after step 401, the method may further include the following steps.

Step 501: Determine, by using the MCU, whether the message supports being replied to.

Specifically, determining, by using the MCU, whether the message supports being replied to may be: determining, by using the MCU, whether a tag indicating that replying is supported exists in the message, where the tag indicating that replying is supported exists in the message is added by the smartphone to the message obtained from the notification bar after the smartphone determines that the message obtained from the notification bar supports being replied to. In this way, if the tag indicating that replying is supported exists in the message, it may be determined that the message supports being replied to. If the tag indicating that replying is supported does not exist in the message, it may be determined by using the MCU whether the message matches a pre-stored message that supports being replied to, and if yes, it may be determined that the message supports being replied to.

In this embodiment, the message sent by the smartphone may include a message to which the tag is added and a message to which the tag is not added. The message to which the tag is not added may be a push message received by a news APP or a video APP in the smartphone, and this type of message does not support being replied to. The message to which the tag is added is obtained by adding, by the smartphone, the tag indicating that replying is supported to the message obtained from the notification bar after the smartphone determines that the message obtained from the notification bar supports being replied to. For example, the message that supports being replied to may be a message received by an instant messaging APP.

The tag indicating that replying is supported includes a package name of an application that is in the smartphone and that sends the message, a user-level identifier in the application, and a process number of running the application. Specifically, a manner of tagging, by the smartphone, the message that supports being replied to may be: pkg+"|"+id+"|"+tag+"|"+uid.

Pkg: indicates a package name of an application.

id: indicates a user-level identifier in the application.

Tag: is generally null and is reserved by a system.

uid: indicates a process number.

During specific implementation, the MCU may pre-store a list of messages that support being replied to. In this way, after receiving a message sent by the smartphone, the wearable device 100 may first determine, by using the MCU, whether a tag indicating that replying is supported exists in the message. If the tag indicating that replying is supported exists in the message, it may be determined that the message supports being replied to. If the tag indicating that replying is supported does not exist in the message, it may be determined by using the MCU whether the message matches a message in the pre-stored message list. If yes, it may be determined that the message supports being replied to.

In this way, step 404 may include the following steps.

Step 502: When the message supports being replied to, and the operation is an operation of a shortcut reply, obtain content of the shortcut reply by using the MCU.

Specifically, refer to FIG. 2. The operation of the shortcut reply may be an operation of tapping the icon 23 by the user. In this case, the content of the shortcut reply may be an emoji emoticon selected by the user from the interface 27. Alternatively, the operation of the shortcut reply may be an operation of tapping the icon 24 by the user. In this case, the content of the shortcut reply may be predefined text information selected by the user from the interface 28.

Step 503: Send the content of the shortcut reply to the smartphone through a channel between the MCU and the smartphone.

Further, in this embodiment, after step 403, the method may further include the following step.

Step 504: Wake up, by using the MCU, the AP and process, by using the AP, the operation when the type of the operation is a second operation type, where the second operation type may include a customized operation.

For example, the customized operation may include an operation such as a customized reply, a customized setting, and/or customized control. A specific operation form of the customized operation is not limited in embodiments.

Specifically, waking up, by using the MCU, the AP and processing, by using the AP, the operation when the type of the operation is the second operation type may be: when the message supports being replied to, and the operation is an operation of triggering a customized reply, waking up the AP by using the MCU and obtaining content of the customized reply by using the AP; and sending the content of the customized reply to the smartphone through a channel between the AP and the smartphone.

Similarly, the channel between the AP of the wearable device 100 and the smartphone may be a Bluetooth channel, or may be a Wi-Fi channel, or may be a wireless communication channel of another type. A type of the channel between the smartphone and the AP of the wearable device 100 is not limited in embodiments. During specific implementation, the AP of the wearable device 100 may establish the channel with the smartphone by using the Bluetooth unit 140.

Specifically, refer to FIG. 2. The operation of triggering the customized reply may be an operation of tapping the information box 25 by the user. In this case, the content of the customized reply may be a customized text input by the user. Alternatively, the operation of triggering the customized reply may be an operation of tapping the icon 26 by the user. In this case, the content of the customized reply may be a customized emoticon, a motion record, and/or a name card of a contact input by the user. Alternatively, the operation of triggering the customized reply may be an operation of tapping the icon 29 by the user. In this case, the content of the customized reply may be a voice input by the user.

In this embodiment, the wearable device 100 determines a default processing channel of a service based on a type of reply content. In this way, the service is dynamically run on an MCU side or an AP side. This avoids frequently waking up the AP and improves a battery life of the wearable device 100.

Figure 6:
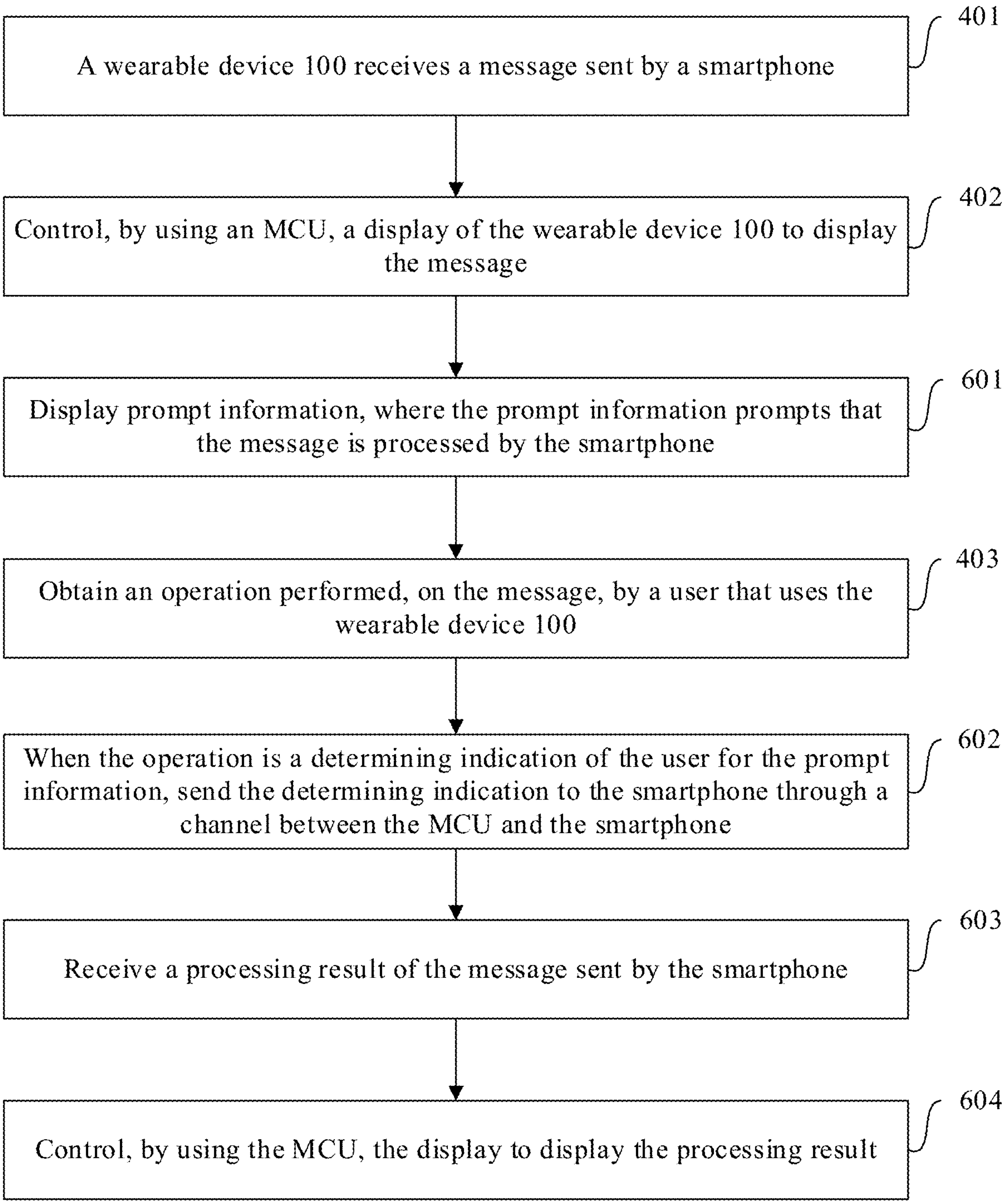
FIG. 6 is a flowchart of a message processing method according to still another embodiment.

FIG. 6 is a flowchart of a message processing method according to still another embodiment. As shown in FIG. 6, in the embodiment shown in FIG. 4, before step 403, the method may further include the following step.

Step 601: Display prompt information, where the prompt information prompts that the message is processed by the smartphone.

In this way, step 404 may include the following steps.

Step 602: When the operation is a determining indication of the user for the prompt information, send the determining indication to the smartphone through a channel between the MCU and the smartphone.

Step 603: Receive a processing result of the message sent by the smartphone.

Step 604: Control, by using the MCU, the display to display the processing result.

Specifically, when a card-type application or an FA-type application is sent from the smartphone, after the MCU displays the card-type application or the FA-type application, prompt information may be displayed on the display 194 of the wearable device 100, to prompt that the card-type application or the FA-type application is processed by the smartphone. After obtaining a determining indication of the user for the prompt information, the wearable device 100 may send the determining indication to the smartphone through the channel between the MCU and the smartphone. Then, the wearable device 100 receives a processing result of the message sent by the smartphone, and controls, by using the MCU, the display to display the processing result.

The FA-type application may be an application that is similar to a functional unit and does not need to be installed.

It may be understood that some or all of the steps or operations in the foregoing embodiments are merely examples. Other operations or variations of various operations may be further performed in embodiments. In addition, the steps may be performed in a sequence different from that presented in the foregoing embodiments, and not all operations in the foregoing embodiments may need to be performed.

It may be understood that, to implement the foregoing functions, the first electronic device includes corresponding hardware and/or software modules for performing the functions. Algorithm steps in the examples described with reference to embodiments disclosed in this application can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope.

In this embodiment, the first electronic device may be divided into functional modules according to the foregoing method embodiments. For example, each functional module may be obtained through division based on each corresponding function, or two or more functions may be integrated into one module. The integrated module may be implemented in a form of hardware. It should be noted that module division in this embodiment is an example and is merely logical function division. During actual implementation, there may be another division manner.

Figure 7:
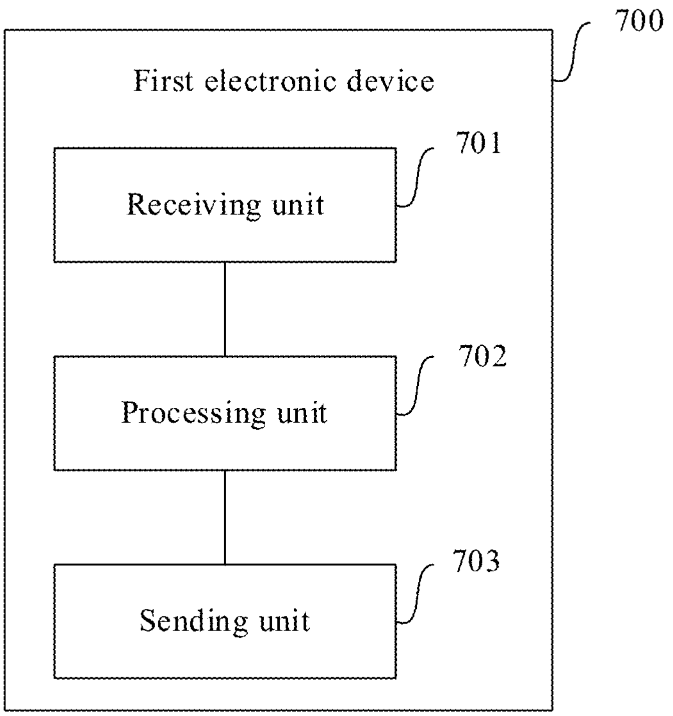
FIG. 7 is a schematic diagram of a structure of a first electronic device according to another embodiment.

FIG. 7 is a schematic diagram of a structure of a first electronic device according to another embodiment. When each functional module is obtained through division based on each corresponding function, FIG. 7 is a possible schematic composition diagram of a first electronic device 700 according to the foregoing embodiment. As shown in FIG. 7, the first electronic device 700 may include a receiving unit 701, a processing unit 702, and a sending unit 703.

The receiving unit 701 may be configured to support the first electronic device 700 in performing step 401 and step 603, and/or another process of the technical solution described in embodiments.

The processing unit 702 may be configured to support the first electronic device 700 in performing step 402, step 403, step 404, step 501, step 502, step 601, and step 604, and/or another process of the technical solution described in embodiments.

The sending unit 703 may be configured to support the first electronic device 700 in performing step 503 and step 602, and/or another process of the technical solution described in embodiments.

It should be noted that all related content of the steps in the foregoing method embodiments may be cited in function descriptions of corresponding functional modules. Details are not described herein.

The first electronic device 700 provided in this embodiment is configured to execute the message processing method, and therefore can achieve same effect as the foregoing method.

It should be understood that the first electronic device 700 may correspond to the first electronic device 100 shown in FIG. 1. Functions of the receiving unit 701 and the sending unit 703 may be implemented by the processor 110, the antenna 1, and the mobile communication module 150 in the first electronic device 100 shown in FIG. 1, and/or by the processor 110, the antenna 2, and the wireless communication module 160 in the first electronic device 100 shown in FIG. 1. Functions of the processing unit 702 may be implemented by the processor 110 and the display 194 in the first electronic device 100 shown in FIG. 1.

When an integrated unit is used, the first electronic device 700 may include a processing module, a storage module, and a communication module.

The processing module may be configured to control and manage an action of the first electronic device 700, for example, may be configured to support the first electronic device 700 in performing the steps performed by the receiving unit 701, the processing unit 702, and the sending unit 703. The storage module may be configured to support the first electronic device 700 in storing program code, data, and the like. The communication module may be configured to support the first electronic device 700 in communicating with another device.

The processing module may be a processor or a controller, and may implement or execute logical blocks, modules, and circuits in various examples described with reference to content disclosed in this application. Alternatively, the processor may be a combination implementing a computing function, for example, a combination of an MCU and an AP. The storage module may be a memory. The communication module may be specifically a device, for example, a radio frequency circuit, a Bluetooth chip, and/or a Wi-Fi chip, that interacts with another electronic device.

In an embodiment, when the processing module is a processor, and the storage module is a memory, the first electronic device 700 in this embodiment may be a device having the structure shown in FIG. 1.

An embodiment further provides a computer-readable storage medium. The computer-readable storage medium stores a computer program. When the computer program is run on a computer, the computer is enabled to perform the methods provided in embodiments shown in FIG. 2 to FIG. 6 in this application.

An embodiment further provides a computer program product. The computer program product includes a computer program. When the computer program is run on a computer, the computer is enabled to perform the methods provided in embodiments shown in FIG. 2 to FIG. 6 in this application.

In embodiments, "at least one" means one or more, and "a plurality of" means two or more. The term "and/or" describes an association relationship between associated objects and indicates that three relationships may exist. For example, A and/or B may indicate the following three cases: Only A exists, both A and B exist, and only B exists, where A and B may be singular or plural. The character "/" generally indicates an "or" relationship between the associated objects. "At least one of the following items" and a similar expression thereof refer to any combination of these items, including a singular item or any combination of plural items. For example, at least one of a, b, or c may indicate a, b, c, a and b, a and c, b and c, or a, b, and c, where a, b, and c may be singular or plural.

A person of ordinary skill in the art may be aware that, with reference to embodiments disclosed in this specification, described units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments, when any of the functions is implemented in a form of a software functional unit and sold or used as an independent product, the functions may be stored in a computer-readable storage medium. Based on such an understanding, the technical solutions, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments. The foregoing storage medium includes any medium that can store program code, such as a USB flash drive, a removable hard disk, a ROM, a RAM, a magnetic disk, or an optical disc.

The foregoing descriptions are merely specific implementations. Any variation or replacement readily figured out by a person skilled in the art within the technical scope disclosed in this application shall fall within the protection scope of this disclosure. The protection scope shall be subject to the protection scope of the claims.

What is claimed is:

1. A method, applied to a first electronic device, wherein the first electronic device comprises a first processor and a second processor, and wherein the method comprises:
- receiving, by the first electronic device, a message from a second electronic device;
- controlling, using the second processor, a display of the first electronic device to display the message;
  - identifying, using the second processor, whether a tag in the message indicates that replying is supported, wherein the identifying comprises either:
  - (i) identifying that the tag that indicates replying is supported exists in the message; or
  - (ii) determining that the message is capable of being replied to when the tag does not exist in the message and when the message matches a pre-stored message that is capable of being replied to;
  - obtaining an operation performed on the message; and either:
  - (a) processing, using the second processor, the operation when a type of the operation is a first operation type, wherein the first operation type comprises a shortcut operation, wherein the processing comprises:
    - obtaining content of a shortcut reply when the message is capable of being replied to and when the operation is a shortcut reply; and
    - sending the content of the shortcut reply to the second electronic device through a channel between the second processor and the second electronic device; or
  - (b) waking up, using the second processor, the first processor, and processing, using the first processor, the operation when the operation is a second operation type comprising a customized operation, wherein the processing comprises:
    - obtaining content of a customized reply using the first processor when the message is capable of being replied to and when the operation triggers a customized reply; and
    - sending the content of the customized reply to the second electronic device through a channel between the first processor and the second electronic device.

2. The method of claim 1, wherein the controlling comprises:
- controlling, using the second processor, the display to display the message in half screen; and
- controlling, thereafter, using the second processor, the display to display the message in full screen when the first electronic device detects, within a predetermined duration after receiving the message, an operation indicating that the message has been viewed.

3. The method of claim 1, wherein the message comprises a notification message from a notification bar of the second electronic device.

4. The method of claim 1, wherein the tag indicating that replying is supported comprises a package name of an application that is in the second electronic device and that sends the message, a user-level identifier in the application, and a process number of running the application.

5. The method of claim 4, wherein the second processor extracts the package name, the user-level identifier, and the process number from the tag to determine whether the message is capable of being replied to without waking the first processor.

6. The method of claim 1, wherein before obtaining an operation performed on the message, the method further comprises:
- displaying prompt information indicating that the message is processed by the second electronic device;
- sending, based on a response to the prompt information, a reply determination indication indicating whether the message is to be replied to, to the second electronic device through a channel between the second processor and the second electronic device;
- receiving a processing result from the second electronic device; and
- controlling, using the second processor, the display to display the processing result.

7. The method of claim 1, wherein the first processor is an application processor (AP), and wherein the second processor is a microcontroller unit (MCU).

8. The method of claim 1, wherein the second processor determines that the operation is the first operation type when a user interacts with a first display element of the first electronic device, or determines that the operation is the second operation type when the user interacts with a second display element of the first electronic device that is different from the first display element.

9. The method of claim 1, wherein the channel between the second processor and the second electronic device is a BLUETOOTH channel or a Wi-Fi channel that is maintained while the first processor is in a dormant state.

10. A first electronic device, comprising:

a memory configured to store a computer program; and a first processor and a second processor, wherein the first processor and the second processor are coupled to the memory and configured to execute the computer program to cause the first electronic device to:

receive a message from a second electronic device;

control, using the second processor, a display of the first electronic device to display the message;

identify, using the second processor, whether a tag in the message indicates that replying is supported, wherein the identifying comprises either:

(i) identifying that the tag that indicates replying is supported exists in the message; or (ii) determining that the message is capable of being replied to when the tag does not exist in the message and when the message matches a pre-stored message that is capable of being replied to;

obtain an operation performed on the message; and either:

(a) process, using the second processor, the operation when a type of the operation is a first operation type, wherein the first operation type comprises a shortcut operation, wherein the processing comprises:

obtaining content of a shortcut reply when the message is capable of being replied to and when the operation is a shortcut reply; and sending the content of the shortcut reply to the second electronic device through a channel between the second processor and the second electronic device; or (b) wake up, using the second processor, the first processor, and process, using the first processor, the operation when the operation is a second operation type comprising a customized operation, wherein the processing comprises:

obtaining content of a customized reply using the first processor when the message is capable of being replied to and when the operation triggers a customized reply; and sending the content of the customized reply to the second electronic device through a channel between the first processor and the second electronic device.

11. The first electronic device of claim 10, wherein the computer program further causes the first electronic device to:

control, using the second processor, the display to display the message in half screen; and then control, using the second processor, the display to display the message in full screen when the first electronic device detects, within a predetermined duration of receiving the message, an operation indicating that the message has been viewed.

12. The first electronic device of claim 10, wherein the message received from the second electronic device comprises a message obtained from a notification bar of the second electronic device.

13. The first electronic device of claim 10, wherein the tag indicating that replying is supported comprises a package name of an application that is in the second electronic device and that sends the message, a user-level identifier in the application, and a process number of running the application.

14. The first electronic device of claim 13, wherein the second processor is configured to extract the package name, the user-level identifier, and the process number from the tag to determine whether the message is capable of being replied to without waking the first processor.

15. The first electronic device of claim 10, wherein the operation is a first operation type, and wherein the computer program further causes the first electronic device to:

display prompt information indicating that the message is processed by the second electronic device;

send, based on the prompt information, a reply determination indication indicating whether the message is to be replied to, to the second electronic device through a channel between the second processor and the second electronic device;

receive a processing result from the second electronic device; and control, using the second processor, the display to display the processing result.

16. The first electronic device of claim 10, wherein the first processor is an application processor, and wherein the second processor is a microcontroller unit.

17. The first electronic device of claim 10, wherein the channel between the second processor and the second electronic device and the channel between the first processor and the second electronic device are independent communication channels, and wherein the second processor is configured to maintain the channel between the second processor and the second electronic device while the first processor is in a dormant state.

18. The first electronic device of claim 10, wherein the second processor is configured to determine that the operation is the first operation type when a user interacts with a first display element of the first electronic device, and is configured to determine that the operation is the second operation type when the user interacts with a second display element of the first electronic device that is different from the first display element.

19. The first electronic device of claim 10, wherein the channel between the second processor and the second electronic device is a BLUETOOTH channel or a Wi-Fi channel that is maintained while the first processor is in a dormant state.

20. A method, applied to a first electronic device, wherein the first electronic device comprises a first processor and a second processor, wherein a first communication channel between the second processor and a second electronic device is maintained independently from a second communication channel between the first processor and the second electronic device, and wherein the method comprises:

receiving, via the first communication channel, a message from the second electronic device;

controlling, using the second processor, a display of the first electronic device to display the message;

identifying, using the second processor, whether a tag in the message indicates that replying is supported, wherein the identifying comprises either:

(i) identifying that the tag that indicates replying is supported exists in the message; or (ii) determining that the message is capable of being replied to when the tag does not exist in the message and when the message matches a pre-stored message that is capable of being replied to;

obtaining an operation performed on the message; and either:

(a) processing, using the second processor, the operation when the operation is a first operation type comprising a shortcut operation, wherein the processing comprises:

obtaining content of a shortcut reply when the message is capable of being replied to and when the operation is a shortcut reply; and sending the content of the shortcut reply to the second electronic device through the first communication channel; or (b) waking up, using the second processor, the first processor, and processing, using the first processor, the operation when the operation is a second operation type comprising a customized operation, wherein the processing comprises:

obtaining content of a customized reply using the first processor when the message is capable of being replied to and when the operation triggers a customized reply; and sending the content of the customized reply to the second electronic device through the second communication channel.

* * * * *